(12) United States Patent
Narang et al.

(10) Patent No.: US 8,959,138 B2
(45) Date of Patent: *Feb. 17, 2015

(54) DISTRIBUTED DATA SCALABLE ADAPTIVE MAP-REDUCE FRAMEWORK

(75) Inventors: Ankur Narang, New Delhi (IN); Jyothish Soman, New Delhi (IN)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 13/563,990

(22) Filed: Aug. 1, 2012

(65) Prior Publication Data

US 2013/0086356 A1    Apr. 4, 2013

Related U.S. Application Data

(63) Continuation of application No. 13/249,378, filed on Sep. 30, 2011.

(51) Int. Cl.
*G06F 15/16* (2006.01)
*G06F 15/173* (2006.01)

(52) U.S. Cl.
CPC ................... *G06F 15/17318* (2013.01)
USPC ............ 709/202; 709/221; 709/224; 345/505

(58) Field of Classification Search
CPC ....................................... G06F 15/76
USPC ........................ 709/202, 221–224; 345/505
See application file for complete search history.

(56) References Cited

U.S. PATENT DOCUMENTS

| | | | |
|---|---|---|---|
| 6,226,005 B1 | 5/2001 | Laferriere | |
| 7,650,331 B1 | 1/2010 | Dean et al. | |
| 7,756,919 B1 | 7/2010 | Dean et al. | |
| 7,777,748 B2* | 8/2010 | Bakalash et al. | 345/505 |
| 8,060,773 B1* | 11/2011 | Katkar et al. | 714/4.1 |
| 8,082,289 B2* | 12/2011 | Tannenbaum et al. | 709/201 |
| 8,190,610 B2* | 5/2012 | Dasdan et al. | 707/737 |
| 8,239,394 B1 | 8/2012 | Hogue et al. | |
| 8,276,148 B2* | 9/2012 | Cho et al. | 718/102 |
| 2002/0046139 A1* | 4/2002 | Ozaki et al. | 705/27 |
| 2004/0078364 A1* | 4/2004 | Ripley et al. | 707/3 |
| 2005/0027719 A1* | 2/2005 | Maciel et al. | 707/100 |
| 2008/0086442 A1* | 4/2008 | Dasdan et al. | 707/1 |
| 2008/0120314 A1* | 5/2008 | Yang et al. | 707/101 |
| 2008/0246772 A1* | 10/2008 | Bakalash et al. | 345/505 |

(Continued)

OTHER PUBLICATIONS

Ekanayake et al., Twister: A Runtime for Iterative Map Reduce, Conference'10, Month 1-2, 2010, pp. 1-9.

(Continued)

*Primary Examiner* — Razu Miah
(74) *Attorney, Agent, or Firm* — Ryan, Mason & Lewis, LLP

(57) ABSTRACT

A method for generating a distributed data scalable adaptive map-reduce framework for at least one multi-core cluster. The method includes partitioning a cluster into at least one computational group, determining at least one key-group leader within each computational group, performing a local combine operation at each computational group, performing a global combine operation at each of the at least one key-group leader within each computational group based on a result from the local combine operation, and performing a global map-reduce operation across the at least one key-group leader within each computational group.

7 Claims, 3 Drawing Sheets

(56) References Cited

U.S. PATENT DOCUMENTS

| | | | |
|---|---|---|---|
| 2009/0089560 A1 | 4/2009 | Liu et al. | |
| 2009/0222543 A1* | 9/2009 | Tannenbaum et al. | 709/222 |
| 2010/0005080 A1 | 1/2010 | Pike et al. | |
| 2010/0162230 A1* | 6/2010 | Chen et al. | 717/177 |
| 2010/0274760 A1* | 10/2010 | Diot et al. | 707/627 |
| 2011/0066649 A1 | 3/2011 | Berlyant et al. | |
| 2011/0145321 A1* | 6/2011 | Jiang | 709/203 |
| 2011/0154339 A1 | 6/2011 | Lee et al. | |
| 2011/0154341 A1 | 6/2011 | Pueyo et al. | |
| 2012/0016901 A1* | 1/2012 | Agarwal et al. | 707/769 |
| 2012/0158694 A1* | 6/2012 | Skrenta et al. | 707/709 |
| 2012/0246643 A1* | 9/2012 | Chang et al. | 718/1 |
| 2012/0254597 A1* | 10/2012 | Delling et al. | 712/233 |
| 2012/0311581 A1 | 12/2012 | Balmin et al. | |
| 2013/0086355 A1 | 4/2013 | Narang et al. | |

OTHER PUBLICATIONS

Papadimitriou et al., Disco: Distributed Co-Clustering with Map-Reduce, 2008 Eighth IEEE International Conference on Data Mining, pp. 512-521.

Zhang et al., Accelerating Map Reduce with Distributed Memory Cache, ICPADS '09 Proceedings of the 2009 15th International Conference on Parallel and Distributed Systems IEEE Computer Society Washington, DC, USA, 2009, pp. 472-478.

Kim et al., Improving Map Reduce Performance by Exploiting Input Redundancy, Journal of Information Science and Engineering 27, 789-804 (2011).

Rafique et al., Supporting Map Reduce on Large-Scale Asymmetric Multi-Core Clusters, pp. 25-34, downloaded Dec. 12, 2011.

Isard et al., Dryard: Distributed Data-Parallel Programs from Sequential Building Blocks, in Proceedings of the 2nd ACM SIGOPS/EuroSys European Conference on Computer Systems 2007, pp. 1-14.

Dean et al., MapReduce: Simplified Data Processing on Large Clusters: In Proceedings of the OSDI'04: Sixth Symposium on Operating System Design and Implementation, Dec. 2004, pp. 1-27.

Yang et al, Map-Reduce-Merge: Simplified Relational Data Processing on Large Clusters, proceedings of the 2007 ACM SIGMOD International Conference on Management of Data, pp. 1029-1040.

Chaiken et al., Scope: Easy and Efficient Parallel Processing of Massive Data Sets, proceedings of the VLDB Endowment, vol. 1, Issue 2, Aug. 2008, pp. 1-12.

Chu et al., Map-Reduce for Machine Learning on Multicore, proceedings of the 2006 Conference on Advances in Neural Information Processing Systems, pp. 1-8.

He et al., Mars: A MapReduce Framework on Graphics Processors, Proceedings of the 17th International Conference on Parallel Architectures and Compilation Techniques, pp. 1-12, downloaded Dec. 12, 2011.

Ranger et al., Evaluating MapReduce for Multi-Core and Multiprocessor Systems, Proceedings of the 2007 IEEE 13th International Symposium on High Performance Computer Architecture, pp. 1-12.

Meijer et al., Functional Programming with Bananas, Lenses, Envelopes and Barbed Wire, Functional Programming Languages and Computer Architecture, pp. 124-144, 1991.

Zaharia et al., Improving MapReduce Performance in Heterogeneous Environments, Proceedings of 2008 USENIX OSDI, pp. 1-14.

Becerra et al., Speeding Up Distributed Map Reduce Applications Using Hardware Accelerators, 2009, International Conference on Parallel Processing, pp. 42-49.

Gufler et al. Handing Data Skew in MapReduce, May 8, 2011, pp. 1-21.

Gufler et al. Handling Data Skew in MapReduce, Closer 2011, International Conference on Cloud Computing and Services Science, pp. 574-583.

Luo et al., A Hierarchical Framework for Cross-Domain MapReduce Execution, ECMLS 2011, Proceedings of the Second International Workshop on Emerging Computational Methods for the Life Sciences, p. 15-22.

* cited by examiner

DISTRIBUTED DATA SCALABLE ADAPTIVE MAP-REDUCE FRAMEWORK

CROSS-REFERENCE TO RELATED APPLICATIONS

This application is a continuation of U.S. patent application Ser. No. 13/249,378, filed Sep. 30, 2011, and incorporated by reference herein.

FIELD OF THE INVENTION

Embodiments of the invention generally relate to information technology, and, more particularly, to a map reduce framework.

BACKGROUND OF THE INVENTION

Petascale analytics require an efficient map reduce framework that can leverage advances in processor technologies to improve the performance/cost ratio. Communication bottlenecks are a major roadblock for high throughput map-reduce over large quantities of data (for example, terabytes to petabytes). Currently, map-reduce frameworks suffer from such communication bottlenecks. Further, existing map-reduce frameworks are not able to leverage hybrid systems that provide accelerators. Additionally, the scheduling of the map reduce system is primarily centralized. Accordingly, there exists a need for distributed map reduce over large clusters.

SUMMARY OF THE INVENTION

In one aspect of the present invention, a distributed data scalable adaptive map-reduce framework is provided. An exemplary computer-implemented method for generating a distributed data scalable adaptive map-reduce framework for at least one multi-core cluster can include steps of partitioning a cluster into at least one computational group, determining at least one key-group leader within each computational group, performing a local combine operation at each computational group, performing a global combine operation at each of the at least one key-group leader within each computational group based on a result from the local combine operation, and performing a global map-reduce operation across the at least one key-group leader within each computational group.

Another aspect of the invention or elements thereof can be implemented in the form of an article of manufacture tangibly embodying computer readable instructions which, when implemented, cause a computer to carry out a plurality of method steps, as described herein.

Furthermore, another aspect of the invention or elements thereof can be implemented in the form of an apparatus including a memory and at least one processor that is coupled to the memory and operative to perform noted method steps.

Yet further, another aspect of the invention or elements thereof can be implemented in the form of means for carrying out the method steps described herein, or elements thereof; the means can include (i) hardware module(s), (ii) software module(s), or (iii) a combination of hardware and software modules; any of (i)-(iii) implement the specific techniques set forth herein, and the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION OF EMBODIMENTS

Figure 1:
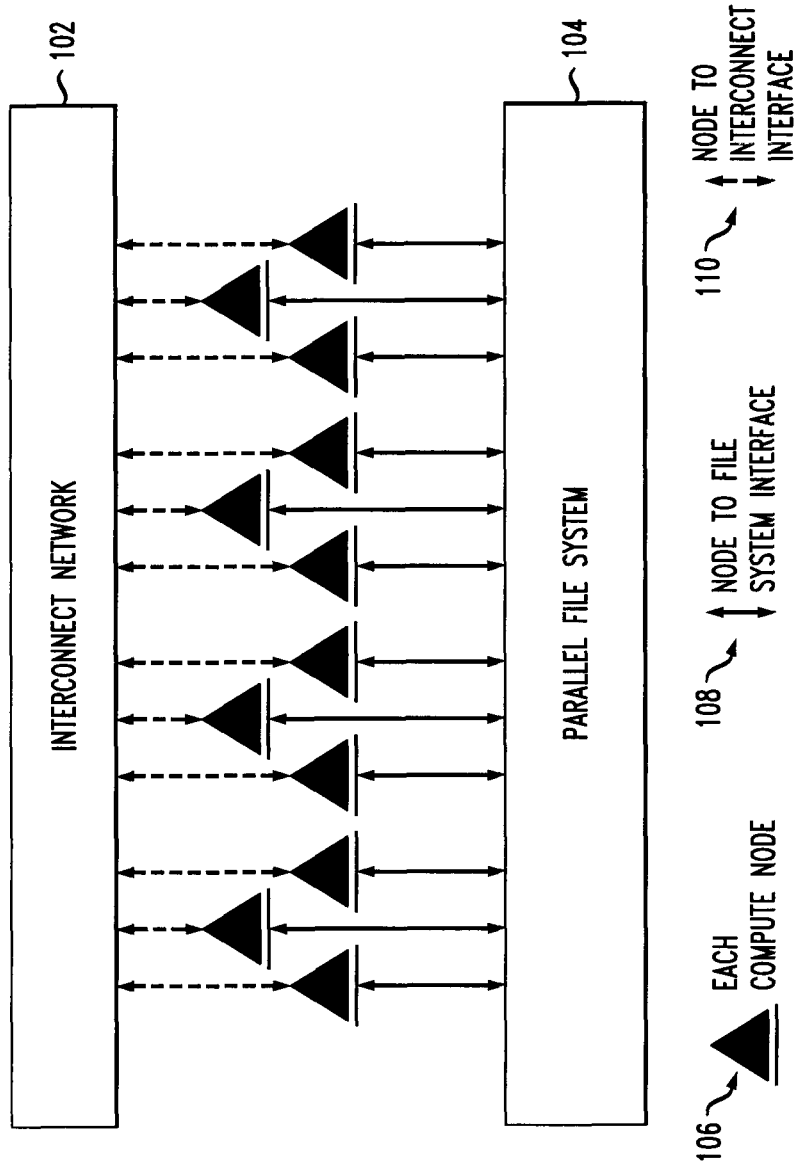
FIG. 1 is an example cluster diagram illustrating an example embodiment, according to an aspect of the invention.

As described herein, an aspect of the present invention includes an optimized distributed map reduce framework for large scale multi-core hybrid clusters. An embodiment of the invention includes a global combine phase and splitting batch mode map-reduce into multiple map-reduce iterations. A user can specify this combine function along with the final reduce function. Additionally, the framework detailed herein uses a two-level approach that enables a divide-conquer strategy for very large scale clusters and efficient communication within each computation group at a level.

Accordingly, a data scalable designed framework as detailed herein provides significant performance and cost advantage over conventional map reduce approaches. For example, an aspect of the invention includes leveraging advances in process technologies to improve performance/cost ratio, as well as reducing communication bottlenecks due to high throughput map-reduce over large quantities of data (terabytes to petabytes).

As described herein, an asynchronous map reduce algorithm includes mapping, combining locally, combining globally, and reducing globally. A cluster is partitioned into computational groups. Each computational group represents a locally dense group, which can include, for example, multiprocessor machines and tightly coupled clusters. Also, each map reduce computation is converted into an iterative map-combine then reduce operation. This can include a large number of smaller maps, combine-local, and/or combine-global operations, as well as one reduce operation per key.

An aspect of the invention additionally includes facilitating stronger combine operations which allow for lesser communication overhead. This can be useful, for example, in scenarios where data reduction is substantial. The splitting of map-combine-reduce into multiple map-network combine stages then a global reduce allows the network utilization to be smoothed over time, rather than providing small time windows with substantial data movement.

A map algorithm, as detailed herein, includes work stealing within a group (computation-group), as well as load balancing within a computation-group. A combiner algorithm includes key clustering. With an objective of low communication in combine-global and reduce steps, a combiner algorithm generates key-groups. Such an algorithm also includes a two-level hierarchy. Within computation groups, key-group leaders are determined. A local combine operation is performed at each node, and a global combine operation is performed at the leaders for each key group. Also, across the key-group leaders, a Steiner tree-based reduce operation is performed.

Accordingly, distributed Steiner trees are used one each per key-group, changing topology with changing computation-spread per key-group. That is, the Steiner tree is dependent on the spread of each key-group with a different tree for each key group. An aspect of the invention also includes locality-driven Steiner trees. Further, adaptive Steiner tree construction and key grouping can be used specifically in the case of a compute or communication dominated kernel on map-reduce. Additionally, an embodiment of the invention includes bloom filters used in connection with key availability queries.

As also described herein, a reduce algorithm includes merging all combiner outputs into a single output. A disk-based map reduce enables pipelined reduce functionality with reduce-compute overlap with a disk-based read. An embodiment of the invention includes virtual fat nodes, which include using a group of base nodes in a small cluster to leverage a distributed shared memory infrastructure. Message passing interface/deep computing messaging framework (MPI/DCMF) based communication can be used within a fat node, which may be useful, for example, for in-memory map reduce.

For disk-based communication for large data, the number of files generated can include map tasks * reduce/combine tasks. Disk-based communication also includes merging of <key, value> pairs for each reduce tasks, in-memory merge-sort of key-value pairs, a reduce/combine compute and communication overlap, as well as the use of accelerators. Disk-based communication across the fat nodes can include Hadoop distributed file system/general parallel file system (HDFS/GPFS) based communication (across the fat nodes).

Additionally, an aspect of the invention includes the use of accelerators from hybrid systems (such as, for example, Power EN). This can also include HEA communication across the nodes (for example, direct packet injection into the cache), and a compression/de-compression accelerator (for example, compress <key, value> data in communication across the nodes). Accelerators also include a cryptographic accelerator (for example, a bloom filter for processing key-availability queries), and a RegEx accelerator, which can include a lower depth B+ tree and search time acceleration for keys.

Accordingly, an aspect of the invention includes communication optimizations via mapping of map and reduce tasks (for example, topology dependent mapping and two-dimensional map and reduce mapping over a three-dimensional (3D) torus network), dynamic data movement, multi-level map reduce, a structure of combine-reduce trees, and generic/dynamic producer/consumer communication and optimization framework (including, for example, iterative map reduce). Further, as detailed herein, an embodiment of the invention includes locality in combine/reduce tasks, load balancing in compute and communication across the map tasks and reduce tasks, and adaptivity to the nature of the kernel.

Additionally, distributed combiner optimization includes a map/combiner output that is highly distributed. For a given network, for each set of keys, a unique temporary node is selected using a hash/mapping function. A topology tree is created for each key set at a temporary node, and for each key, a temporary node selects a sink node and a combiner tree. The topology of the network is preprocessed to mark bottleneck edges, and nodes are grouped into tightly coupled groups.

Accordingly, an aspect of the invention minimizes the number of bottleneck edges in each topology tree. Each node sorts keys hash mapped to it based on the number of critical links and the number of nodes (#N) having the key. Each communication link offers a predetermined fixed bandwidth for each time window. Key sets with high #N values and a high number of critical links choke bandwidth. High and low valued key groups are interleaved to reduce collisions and congestion, and their approximate data flow tree is built. Additionally, keys that can be accommodated in an earlier time frame are shifted. For each set in the sorted list, the process is repeated until all keys are parsed. As such, each node is given data sources, keys, a time frame and a destination node.

Distribution reduce optimizations include a reduce operation assigned to nodes dynamically. Also, such optimizations include a reduce operation for a given key set given to a centrally located node, which can decrease in amount of data moved over the network. Additionally, a distributed combiner reduces data movement over the network.

An aspect of the invention can also include hybrid systems/prism multi-core cluster (for example, a systems and technology group (STG) differentiator). DCMF based optimizations include the use of an IO accelerator to help in one-sided and asynchronous communication primitives of DCMF. Also, an in-memory map reduce can be used for communication amongst nodes using high speed interconnect.

Accordingly, as detailed herein, a high throughput disk-based map-reduce can include fat nodes as a single Hadoop task. Additionally, an embodiment of the invention includes a local disk per node within the fat node, high speed interconnect-based communication, and use of in-memory performance optimizations (for example, bloom filter, compression/decompression, HEA, and RegEx).

Map-reduce compute efficiency optimizations can include, for example, a map-reduce locality optimization. Such an optimization can include automatic inference of map-reduce locality in workloads with multiple map-reduce iterations, as well as weighted bi-partite graph based analysis for repeating pattern analysis on intermediate pairs coming from map threads and going to reduce threads. A map-reduce locality optimization also includes online sequence motif discovery over map-reduce intermediate pairs access patterns.

Also, map-reduce compute efficiency optimizations can include, for example, a tree-based pipelined reduce for 100s-1000 cores and/or large scale symmetric multiprocessing (SMP) architectures. This includes a reduction in the number of <key, value> pairs observed at the final reduce step per key (as well as a local reduction in total number of <key, value> pairs). Additionally, this can also include cache-aware and load-balance aware reduce tree construction. Each node of the tree can be annotated with a subset of keys for which to reduce, and tree topology is dynamically determined based on the location of key-value hash at map threads. A tree-based pipelined reduce can also include multiple trees for separate subsets of keys, a reduce specified as associative operator+ final operator, and optimizations based on target many-core architecture.

FIG. 1 is an example cluster diagram illustrating an example embodiment, according to an aspect of the invention. By way of illustration, FIG. 1 depicts an interconnect network 102 and a parallel file system 104, with compute nodes 106, nodes to a file system interface 108 and nodes to an interconnect interface 110 therebetween. Put together, they form a generalized model of a cluster. Communication and transfer of computer readable data across the compute nodes is performed over the interconnect network 102. For any interaction between two compute nodes, each compute node 106 utilizes the interconnect interface 110 to form a connection to the interconnect network 102. The interconnection network then allows the two compute nodes to interact with each other using the interconnect interface. The parallel filesystem 104 allows each compute node to write information to a common resource. The parallel filesystem is accessible to all the compute nodes through the file system interface.

Figure 2:
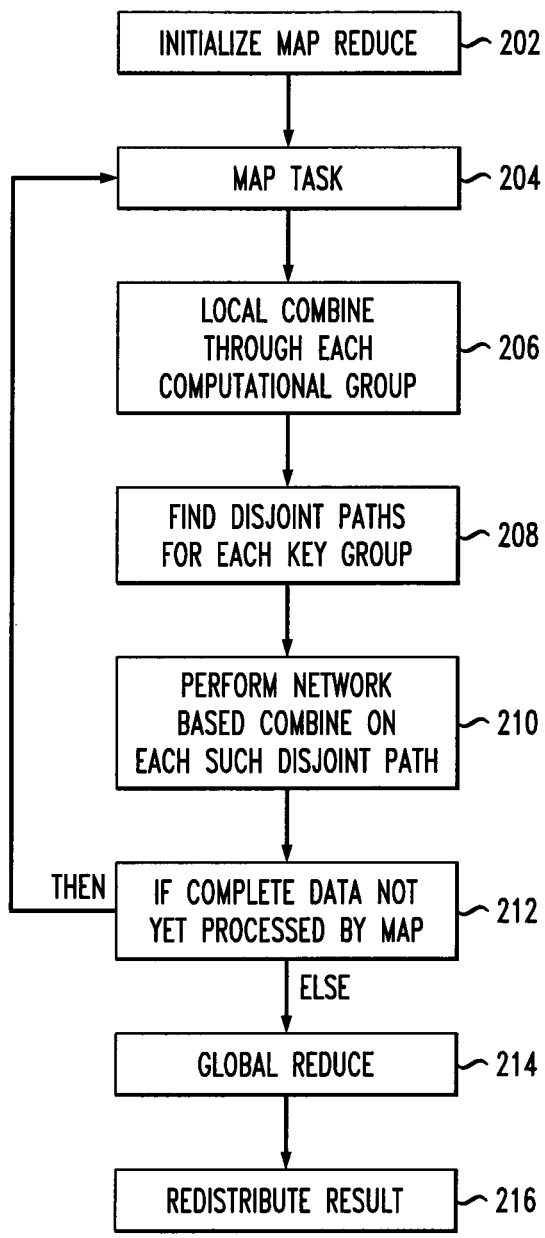
FIG. 2 is a diagram illustrating an example embodiment, according to an aspect of the invention.

FIG. 2 is a diagram illustrating an example embodiment, according to an aspect of the invention. Step 202 includes initializing a map reduce via an initialization module. Step 204 includes mapping a task via a mapping module. Step 206 includes performing a local combine operation through each computational group via a local combine module. Step 208 includes determining disjoint paths for each key group via a path determination module. Step 210 includes performing a network based combine operation on each such disjoint path via a network combine module. If the complete data has not yet been processed by the map in step 212, then the process returns to step 204. Otherwise, the process continues to step 214, which includes performing a global reduce operation via a global reduce module. Further, step 216 includes redistributing the result of the global reduce via a redistribution module.

Figure 3:
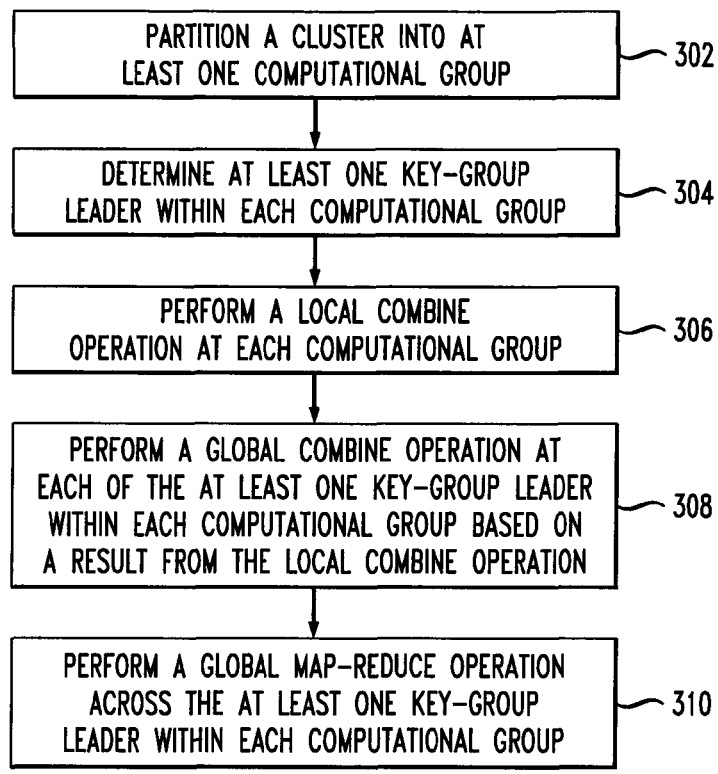
FIG. 3 is a flow diagram illustrating techniques for generating a distributed data scalable adaptive map-reduce framework for at least one multi-core cluster, according to an embodiment of the invention.

FIG. 3 is a flow diagram illustrating techniques for generating a distributed data scalable adaptive map-reduce framework for at least one multi-core cluster, according to an embodiment of the present invention. Step 302 includes partitioning a cluster into at least one computational group. This step can be carried out, for example, using at least one module as detailed herein.

Step 304 includes determining at least one key-group leader within each computational group. This step can be carried out, for example, using at least one module as detailed herein. Step 306 includes performing a local combine operation at each computational group. This step can be carried out, for example, using at least one module as detailed herein. Step 308 includes performing a global combine operation at each of the at least one key-group leader within each computational group based on a result from the local combine operation. This step can also be carried out, for example, using at least one module as detailed herein.

Step 310 includes performing a global map-reduce operation across the at least one key-group leader within each computational group. This step can be carried out, for example, using at least one module as detailed herein. Performing a global map-reduce operation can include performing a Steiner tree-based reduce operation across the key-group leader(s) within each computational group. Also, performing a Steiner tree-based reduce operation includes using one distributed Steiner tree used per key-group.

As detailed herein, the distributed data scalable adaptive map-reduce framework is adaptive to a nature of kernel (for example, compute intensive (load balance issue) to communication intensive (huge key-value pairs)). Additionally, the techniques depicted in FIG. 3 also include using at least one accelerator to accelerate an execution of a map-reduce operation. The at least one accelerator can include, for example, a bloom filter (for example, used in connection with key availability queries), a compression/de-compression accelerator, a cryptographic accelerator and a hybrid system accelerator (for example, HEA and RegEx).

An aspect of the invention further includes merging all combine operation outputs into a single output. Also, the techniques depicted in FIG. 3 can include using at least one virtual fat node for a disk based map-reduce operation, wherein using at least one virtual fat node comprises using a group of at least one base node in a cluster to leverage a distributed shared memory infrastructure. Using a virtual fat node can include, for example, using a virtual fat node for an in-memory map-reduce operation.

Additionally, an embodiment of the invention can also include using the distributed data scalable adaptive map-reduce framework to carry out analytics over multiple clusters using peta-bytes of data.

The techniques depicted in FIG. 3 can also, as described herein, include providing a system, wherein the system includes distinct software modules, each of the distinct software modules being embodied on a tangible computer-readable recordable storage medium. All the modules (or any subset thereof) can be on the same medium, or each can be on a different medium, for example. The modules can include any or all of the components shown in the figures. In an aspect of the invention, the modules include an initialization module, a mapping module, a local combine module, a path determination module, a network combine module, a global reduce module and a redistribution module that can run, for example on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 3 can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code are downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in a computer readable medium having computer readable program code embodied thereon.

An aspect of the invention or elements thereof can be implemented in the form of an apparatus including a memory and at least one processor that is coupled to the memory and operative to perform exemplary method steps.

Figure 4:
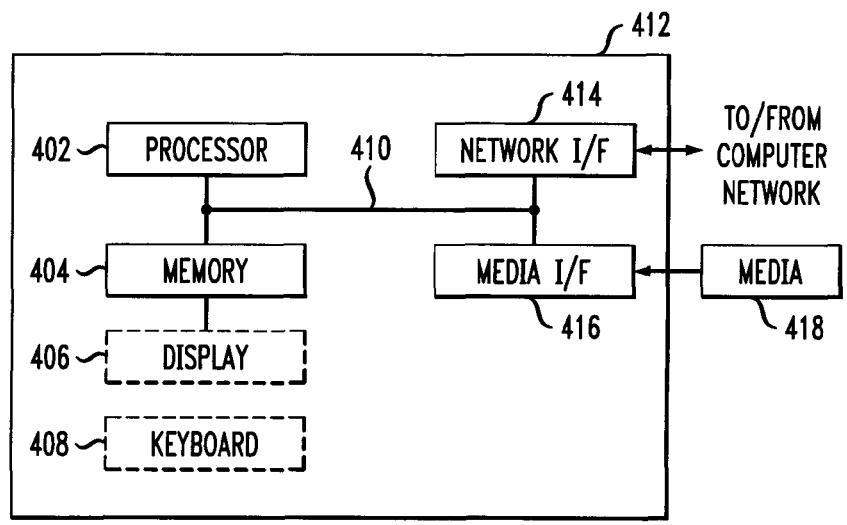
FIG. 4 is a system diagram of an exemplary computer system on which at least one embodiment of the invention can be implemented.

Additionally, an aspect of the present invention can make use of software running on a general purpose computer or workstation. With reference to FIG. 4, such an implementation might employ, for example, a processor 402, a memory 404, and an input/output interface formed, for example, by a display 406 and a keyboard 408. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 402, memory 404, and input/output interface such as display 406 and keyboard 408 can be interconnected, for example, via bus 410 as part of a data processing unit 412. Suitable interconnections, for example via bus 410, can also be provided to a network interface 414, such as a network card, which can be provided to interface with a computer network, and to a media interface 416, such as a diskette or CD-ROM drive, which can be provided to interface with media 418.

Accordingly, computer software including instructions or code for performing the methodologies of the invention, as described herein, may be stored in an associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 402 coupled directly or indirectly to memory elements 404 through a system bus 410. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 408, displays 406, pointing devices, and the like) can be coupled to the system either directly (such as via bus 410) or through intervening I/O controllers (omitted for clarity).

Network adapters such as network interface 414 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 412 as shown in FIG. 4) running a server program. It will be understood that such a physical server may or may not include a display and keyboard.

As noted, aspects of the present invention may take the form of a computer program product embodied in a computer readable medium having computer readable program code embodied thereon. Also, any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of at least one programming language, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Accordingly, an aspect of the invention includes an article of manufacture tangibly embodying computer readable instructions which, when implemented, cause a computer to carry out a plurality of method steps as described herein.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 402. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

At least one aspect of the present invention may provide a beneficial effect such as, for example, leveraging advances in process technologies to improve performance/cost ratio.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for generating a distributed data scalable adaptive map-reduce framework for at least one multi-core cluster, wherein the method comprises the following steps, and wherein the steps are carried out by a computer device:
    partitioning a cluster into multiple computational groups;
    determining at least one key-group leader within each of the multiple computational groups;
    performing a first combine operation at each of the multiple computational groups;
    performing a second combine operation at each of the at least one key-group leader within each of the multiple computational groups based on a result from the first combine operation; and
    performing asynchronous global map-reduce operations across each of the at least one key-group leader within each of the multiple computational groups via performing a Steiner tree-based reduce operation across each of the at least one key-group leader within each of the multiple computational groups, wherein said Steiner tree-based reduce operation comprises using a distributed Steiner tree per key-group.

2. The method of claim 1, further comprising:
    using at least one accelerator to accelerate an execution of a map-reduce operation.

3. The method of claim 2, wherein the at least one accelerator comprises at least one of a bloom filter, a compression/de-compression accelerator, a cryptographic accelerator and a hybrid system accelerator.

4. The method of claim 1, further comprising:
    merging all combine operation outputs into a single output.

5. The method of claim 1, further comprising:
    using at least one virtual fat node for a disk based map-reduce operation, wherein using at least one virtual fat node comprises using a group of at least one base node in a cluster to leverage a distributed shared memory infrastructure.

6. The method of claim 5, wherein using at least one virtual fat node comprises using at least one virtual fat node for an in-memory map-reduce operation.

7. The method of claim 1, further comprising:

using a distributed data scalable adaptive map-reduce framework to carry out analytics over multiple clusters using peta-bytes of data.

\* \* \* \* \*